(12) United States Patent
Nakamura

(10) Patent No.: US 11,904,604 B2
(45) Date of Patent: Feb. 20, 2024

(54) LIQUID DISCHARGE APPARATUS AND LIQUID DISCHARGE METHOD

(71) Applicant: Kahei Nakamura, Tokyo (JP)

(72) Inventor: Kahei Nakamura, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/866,521

(22) Filed: Jul. 17, 2022

(65) Prior Publication Data

US 2023/0067871 A1 Mar. 2, 2023

(30) Foreign Application Priority Data

Aug. 25, 2021 (JP) ................................ 2021-136954

(51) Int. Cl.
*B41J 29/393* (2006.01)
*B41J 2/045* (2006.01)
*G06T 7/00* (2017.01)
*B41J 11/00* (2006.01)

(52) U.S. Cl.
CPC ....... *B41J 2/04526* (2013.01); *B41J 2/04556* (2013.01); *B41J 11/008* (2013.01); *B41J 29/393* (2013.01); *G06T 7/0004* (2013.01); *G06T 2207/30144* (2013.01)

(58) Field of Classification Search
CPC .............. B41J 29/393; B41J 2029/3935; B41J 2/2135; B41J 2/04526; B41J 2/04536; B41J 2/04556; B41J 2/04573; B41J 11/008
See application file for complete search history.

(56) References Cited

U.S. PATENT DOCUMENTS

2020/0079123 A1\* 3/2020 Yoshikawa ............ B41J 2/2117
2021/0046772 A1 2/2021 Nakamura

FOREIGN PATENT DOCUMENTS

JP 2001-063022 3/2001
JP 2018-075819 5/2018

\* cited by examiner

*Primary Examiner* — Scott A Richmond
(74) *Attorney, Agent, or Firm* — Duft & Bornsen, PC

(57) ABSTRACT

A liquid discharge apparatus includes a head, processing circuitry, and a memory. The head includes a plurality of nozzle rows in each of which a plurality of nozzles are arranged. The processing circuitry detects landing positions of the liquid discharged from the plurality of nozzle rows and corrects the landing positions of the liquid based on a result of detecting the landing positions of the liquid. The memory stores data related to a relation among the landing positions of the liquid. The processing circuitry detects landing positions of the liquid discharged from one representative nozzle row. The processing circuitry corrects landing positions of the liquid discharged from all of the plurality of nozzle rows based on a result of detecting the landing positions of the liquid discharged from the one representative nozzle row and the data related to the relation among the landing positions stored in the memory.

5 Claims, 8 Drawing Sheets

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2021-136954, filed on Aug. 25, 2021, in the Japan Patent Office, the entire disclosure of which is hereby incorporated by reference herein.

BACKGROUND

Technical Field

Embodiments of the present disclosure relate to a liquid discharge apparatus and a liquid discharge method.

Related Art

A liquid discharge apparatus that discharges liquid onto a recording medium to form an image is known in the art.

Further, a liquid discharge apparatus is known that forms an image on a recording medium while moving a carriage, including a head for discharging liquid, bidirectionally in a main scanning direction in a reciprocating manner, and corrects deviations of positions (landing positions) at which the liquid land on the recording medium in a forward path and a backward path in the main scanning direction.

SUMMARY

In an embodiment of the present disclosure, a liquid discharge apparatus for forming an image on a recording medium, includes a head, processing circuitry, and a memory. The head includes a plurality of nozzle rows in each of which a plurality of nozzles for discharging liquid are arranged in a predetermined direction. The processing circuitry detects landing positions of the liquid discharged from the plurality of nozzle rows on the recording medium and corrects the landing positions of the liquid based on a result of detecting the landing positions of the liquid. The memory stores data related to a relation among the landing positions of the liquid discharged from the plurality of nozzle rows. The processing circuitry detects landing positions of the liquid discharged from one representative nozzle row among the plurality of nozzle rows. The processing circuitry corrects landing positions of the liquid discharged from all of the plurality of nozzle rows based on a result of detecting the landing positions of the liquid discharged from the one representative nozzle row and the data related to the relation among the landing positions stored in the memory.

In another embodiment of the present disclosure, a liquid discharge method for a liquid discharge apparatus that includes a head having a plurality of nozzle rows in each of which a plurality of nozzles for discharging liquid are arranged in a predetermined direction to form an image on a recording medium, includes detecting, correcting, and storing. Detecting detects landing positions of the liquid discharged from the plurality of nozzle rows on the recording medium. Correcting corrects the landing positions of the liquid based on a result of the detecting. Storing stores data related to a relation among the landing positions of the liquid discharged from the plurality of nozzle rows in a memory. The detecting includes detecting landing positions of the liquid discharged from one representative nozzle row among the plurality of nozzle rows. The correcting includes correcting landing positions of the liquid discharged from all of the plurality of nozzle rows based on a result of the detecting of the landing positions of the liquid discharged from the one representative nozzle row and the data related to the relation among the landing positions stored in the memory.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
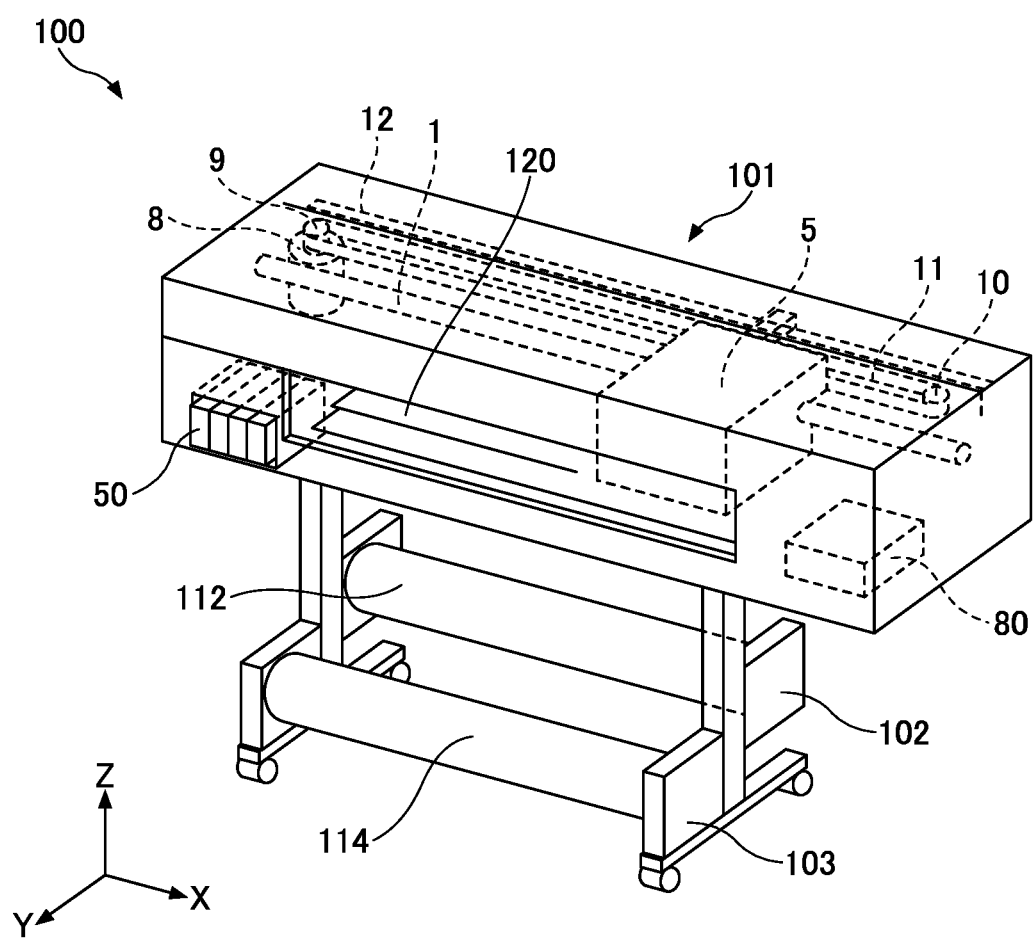
FIG. 1 is a perspective view of a configuration of a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail with reference to the drawings in the following description. In the drawings, like reference signs denote like elements, and redundant or overlapping description thereof may be omitted as appropriate.

In the drawings illustrated below, directions may be indicated by X-axis, Y-axis, and Z-axis. An X-direction along the X-axis indicates a main scanning direction that is a moving direction of a carriage provided for the liquid discharge apparatus according to embodiments of the present disclosure. A Y direction along the Y-axis indicates a sub-scanning direction that is a moving direction of a recording medium. A Z direction along the Z-axis indicates a direction perpendicular to both the main scanning direction and the sub-scanning direction.

A direction in which an arrow points in the X direction is denoted as +X direction, and a direction opposite to the +X direction is denoted as −X direction. A direction in which an arrow points in the Y direction is denoted as +Y direction, and a direction opposite to the +Y direction is denoted as −Y direction. A direction in which an arrow points in the Z direction is referred to as a +Z direction, and a direction opposite to the +Z direction is denoted as a −Z direction. However, the above-described directions do not limit the orientation of the liquid discharge apparatus in use, and the liquid discharge apparatus may be oriented in any direction.

Embodiments

Configuration Example of Liquid Discharge Apparatus 100

Figure 2:
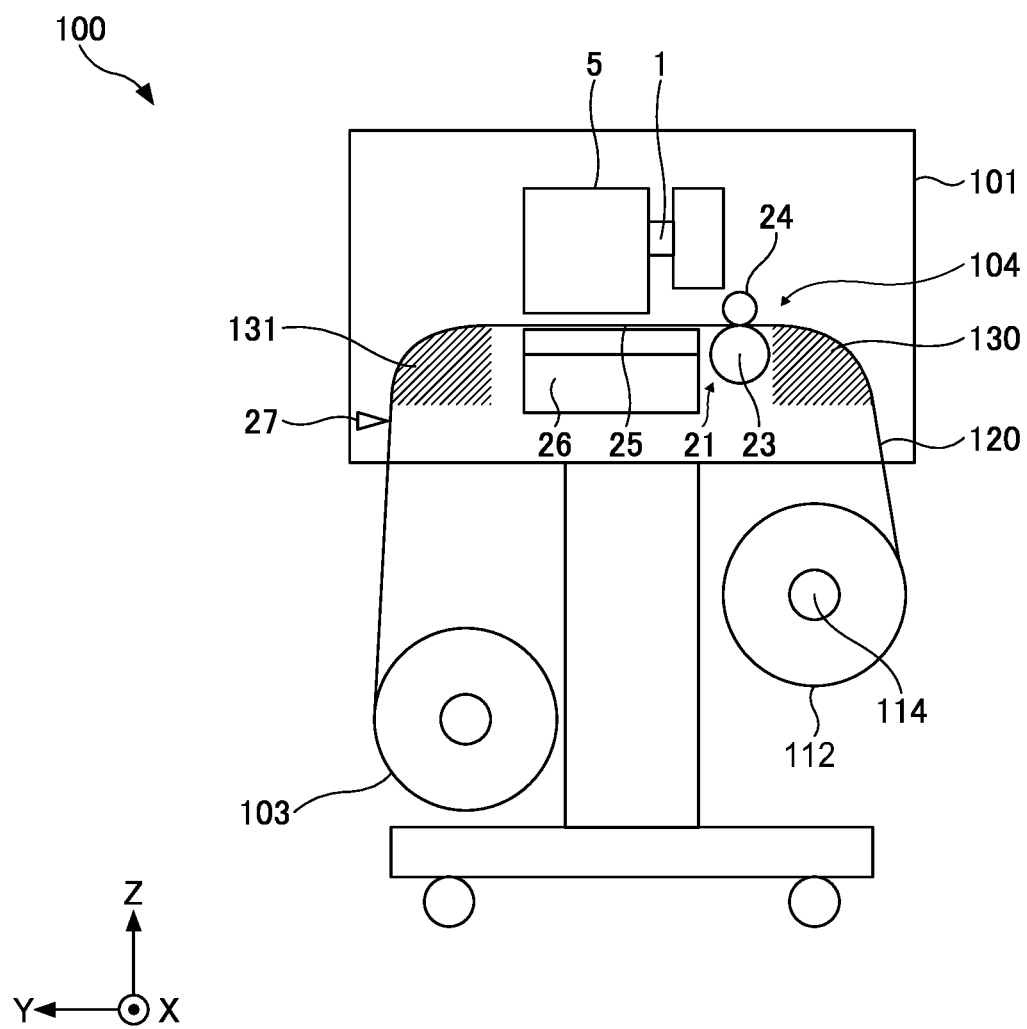
FIG. 2 is a side view of a configuration of a liquid discharge apparatus according to an embodiment of the present disclosure.

The configuration of a liquid discharge apparatus 100 is described with reference to FIGS. 1 and 2. FIG. 1 is a perspective view of the liquid discharge apparatus 100 viewed from the +Z direction, according to the present embodiment. FIG. 2 is a side view of a schematic configuration of the liquid discharge apparatus 100 viewed from the +X direction, according to the present embodiment.

The liquid discharge apparatus 100 is a serial-type image forming apparatus that discharges ink as an example of liquid while moving heads in the main scanning direction to form an image on a sheet roll as an example of a recording medium.

As illustrated in FIG. 1, the liquid discharge apparatus 100 includes an apparatus body 101, a sheet feeder 102 disposed below the apparatus body 101, and a reeling device 103 disposed below the apparatus body 101 in the −Z direction. The sheet feeder 102 may be disposed below the apparatus body 101 in the −Z direction separately from the apparatus body 101 or may be integrated with the apparatus body 101 as illustrated in FIG. 2. The reeling device 103 may also be disposed below the apparatus body 101 separately from the apparatus body 101 in the −Z direction or may be integrated with the apparatus body 101 as illustrated in FIG. 2.

As illustrated in FIG. 2, the sheet feeder 102, the reeling device 103, and an image forming device 104 are disposed inside the apparatus body 101. The sheet feeder 102 feeds a roll sheet 120 that is a roll-shaped recording medium. The reeling device 103 reels the roll sheet 120. The image forming device 104 forms an image on the roll sheet 120.

The image forming device 104 includes a guide 1 as a guide fixed to side plates provided for the liquid discharge apparatus 100. The guide 1 supports a carriage 5 such that the carriage 5 is movable in the X direction, which is the main scanning direction and a carriage moving direction.

As illustrated in FIG. 1, the liquid discharge apparatus 100 includes a main scanning motor 8 that is disposed at an end of the apparatus body 101 in the X direction and serves as a driving source for reciprocating the carriage 5. A driving pulley 9 is rotationally driven by the main scanning motor 8. A driven pulley 10 is disposed at the other end of the apparatus body 101 in the X direction. A timing belt 11 is wound around between the driving pulley 9 and the driven pulley 10. A belt holder of the carriage 5 is fixed to the timing belt 11. Accordingly, driving the main scanning motor 8 allows the carriage 5 to be reciprocated in the X direction.

The carriage 5 includes multiple heads and multiple head tanks disposed integrally in the carriage 5. Each of the multiple head tanks supplies ink to corresponding one of the heads. Each of the multiple heads includes multiple nozzle rows in which multiple nozzles for discharging ink are arranged in the Y direction, i.e., the sub-scanning direction, which is perpendicular to the X direction. Each of the multiple heads includes the multiple nozzle rows disposed such that the ink is discharged in the −Z direction.

The liquid discharge apparatus 100 includes an encoder sheet 12 extending in a direction in which the carriage 5 moves. The carriage 5 includes an encoder sensor for reading the encoder sheet 12. The encoder sheet 12 and the encoder sensor jointly serve as a linear encoder. Accordingly, the liquid discharge apparatus 100 can detect the position and moving speed of the carriage 5 from an output of the linear encoder.

In the liquid discharge apparatus 100, the sheet feeder 102 feeds the roll sheet 120 to an area in which an image is formed on the roll sheet 120 in an area in which the carriage 5 moves in the main scanning direction. In addition, the liquid discharge apparatus 100 includes a conveyor 21 that intermittently conveys the roll sheet 120 in the Y direction perpendicular to the main scanning direction of the carriage 5.

As illustrated in FIG. 1, the liquid discharge apparatus 100 includes ink cartridges 50 that serves as main tanks and that are attached to the apparatus body 101 in a replaceable manner. The ink cartridges 50 supply inks of different colors to the head tanks of the heads through supply tubes. Further, the liquid discharge apparatus 100 includes a maintenance recovery mechanism 80 to perform maintenance and recovery operations of the heads. The maintenance recovery mechanism 80 is disposed at one end of the apparatus body 101 in the X direction and at a lateral side of a conveyance guide 25 (see FIG. 2).

As illustrated in FIG. 2, the conveyor 21 includes a conveyance roller 23 to convey the roll sheet 120 fed from the sheet feeder 102, and a pressure roller 24 disposed to face the conveyance roller 23. The liquid discharge apparatus 100 includes the conveyance guide 25 and a suction fan 26 downstream from the conveyance roller 23 in a conveyance direction of the roll sheet 120. The conveyance guide 25 has multiple suction holes. The suction fan 26 serves as a suction device that performs suction through the suction holes of the conveyance guide 25.

The sheet feeder 102 includes a roll 112. The roll 112 is formed by winding the roll sheet 120 around a hollow shaft 114, such as a paper tube that serves as a core. In the present embodiment, a trailing end of the roll sheet 120 may be fixed to the hollow shaft 114 by bonding such as pasting to form the roll 112, or the trailing end of the roll sheet 120 may not be fixed to the hollow shaft 114 to form the roll 112.

In FIG. 2, the liquid discharge apparatus 100 includes a guide 130 to guide the roll sheet 120 drawn out from the roll 112 of the sheet feeder 102, and a sheet ejection guide 131 for guiding the roll sheet 120 downstream from the conveyance guide 25 in the conveyance direction after the roll sheet 120 is sucked.

The reeling device 103 includes a hollow shaft 115 such as a paper tube as a core, and a leading end of the roll sheet 120 is bonded to the hollow shaft 115 by an adhesive such as a tape.

When image formation is performed, the liquid discharge apparatus 100 moves the carriage 5 in the X direction and intermittently feeds the roll sheet 120 fed from the sheet feeder 102 by using the conveyor 21. The liquid discharge apparatus 100 drives the heads in accordance with image data to discharge ink and forms an image on the roll sheet 120. In the liquid discharge apparatus 100, the roll sheet 120 on which the image has been formed is guided by the sheet ejection guide 131 and is wound up on the hollow shaft 115 in the reeling device 103.

The liquid discharge apparatus 100 includes a cutter 27 as a cutter to cut the roll sheet 120 on which an image has been formed into a predetermined length, downstream from the sheet ejection guide 131 in the conveyance direction.

Configuration Example of Carriage 5

Figure 3:
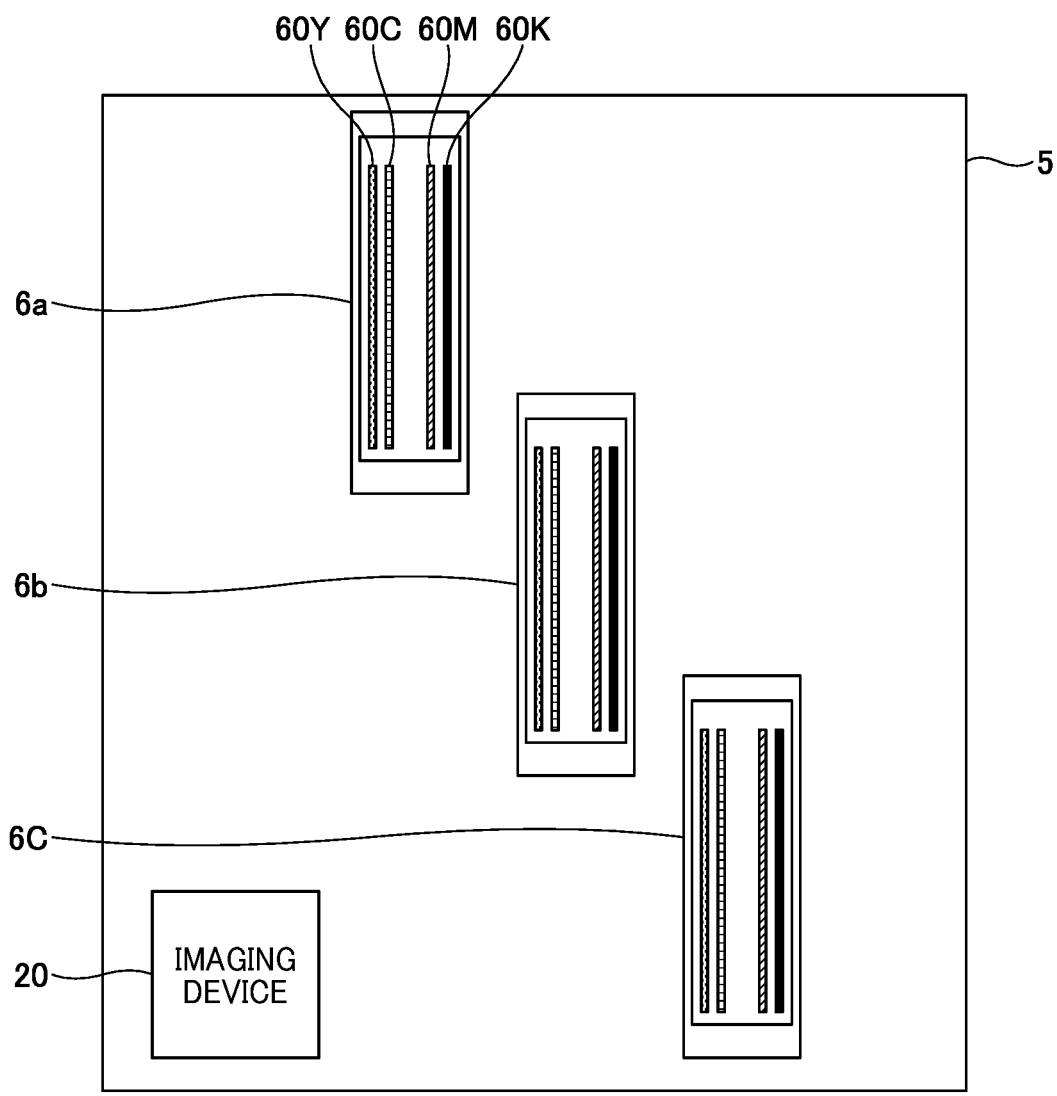
FIG. 3 is a diagram illustrating a configuration of a carriage according to an embodiment of the present disclosure.
Figure 4:
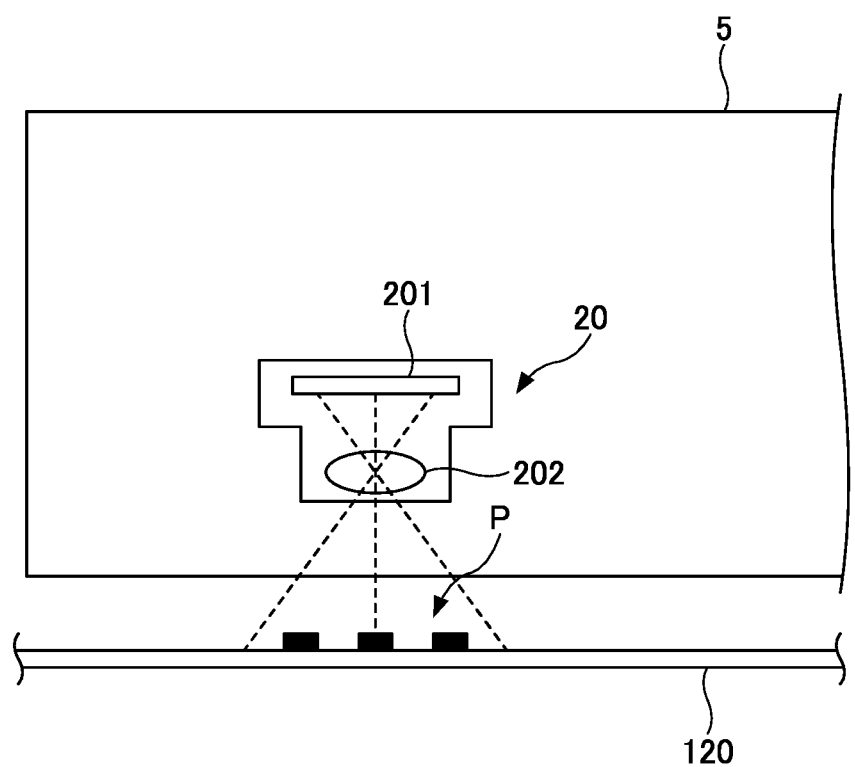
FIG. 4 is a diagram illustrating a configuration of an imaging device according to an embodiment of the present disclosure.

The configuration of the carriage 5 is described with reference to FIGS. 3 and 4. FIG. 3 is a diagram illustrating a configuration of the carriage 5 according to the present embodiment. FIG. 3 illustrates the carriage 5 viewed from the –Z direction. FIG. 4 is a diagram illustrating a configuration of an imaging device 20 provided for the carriage 5, according to the present embodiment.

As illustrated in FIG. 3, the carriage 5 includes three heads 6a, 6b, and 6c arranged in a staggered manner (zig-zag manner). When the above-described heads 6a, 6b, and 6c are not distinguished from each other, the heads 6a, 6b, and 6c are collectively referred to as a head(s) 6 in the following description. The head 6 is supported by the carriage 5 so that a nozzle surface of the head 6 on which nozzles for discharging ink are formed faces the –Z direction.

Each of the heads 6a, 6b, and 6c includes nozzle rows, and each nozzle row including a large number of nozzles arranged in the Y direction, i.e., the sub-scanning direction. More specifically, each of the heads 6a, 6b, and 6c includes a nozzle row 60Y for discharging yellow (Y) ink, a nozzle row 60C for discharging cyan (C) ink, a nozzle row 60M for discharging magenta (M) ink, and a nozzle row 60K for discharging black (K) ink. When the nozzle rows 60Y, 60C, 60M, and 60K are not distinguished from each other, the nozzle rows 60Y, 60C, 60M, and 60K are collectively referred to as a nozzle row 60 in the following description.

In other words, the head 6 includes four nozzle rows 60 in each of which multiple nozzles for discharging ink are arranged in the Y direction, which is an example of a predetermined direction. The liquid discharge apparatus 100 includes the three heads 6a, 6b, and 6c. Each of the heads 6 includes four nozzle rows 60. Accordingly, the liquid discharge apparatus 100 includes a total of twelve nozzle rows 60.

The liquid discharge apparatus 100 intermittently conveys the roll sheet 120 in the Y direction and selectively discharges ink from multiple nozzles included in the nozzle rows 60 in accordance with image data, while reciprocating the carriage 5 in the X direction when the conveyance of the roll sheet 120 is stopped. Thus, an image is formed on the roll sheet 120.

Further, the carriage 5 includes the imaging device 20 for imaging a correction pattern P formed on the roll sheet 120. The imaging device 20 captures an image of a predetermined correction pattern formed on the roll sheet 120 with ink discharged from a representative nozzle row described below.

As illustrated in FIG. 4, the imaging device 20 includes a two-dimensional image sensor 201 such as a charge-coupled device (CCD) sensor or a complementary metal-oxide semiconductor (CMOS) sensor and an imaging lens 202. The imaging lens 202 forms an optical image of the correction pattern P formed on the roll sheet 120, on a light receiving surface of the two-dimensional image sensor 201. The imaging device 20 converts incident light, which is incident through the imaging lens 202, into an electric signal by the two-dimensional image sensor 201, and outputs the electric signal as captured image data of the correction pattern P.

For example, the imaging device 20 is attached to the carriage 5 with a given attachment such that the optical axis of the imaging lens 202 is substantially perpendicular to a surface of the roll sheet 120 set in an image forming region of the liquid discharge apparatus 100. Note that the imaging device 20 may be disposed such that the imaging device 20 can appropriately capture an image of the correction pattern P formed on the roll sheet 120 and may not necessarily be disposed in the carriage 5.

Configuration Example of Main Control Board 135

Figure 5:
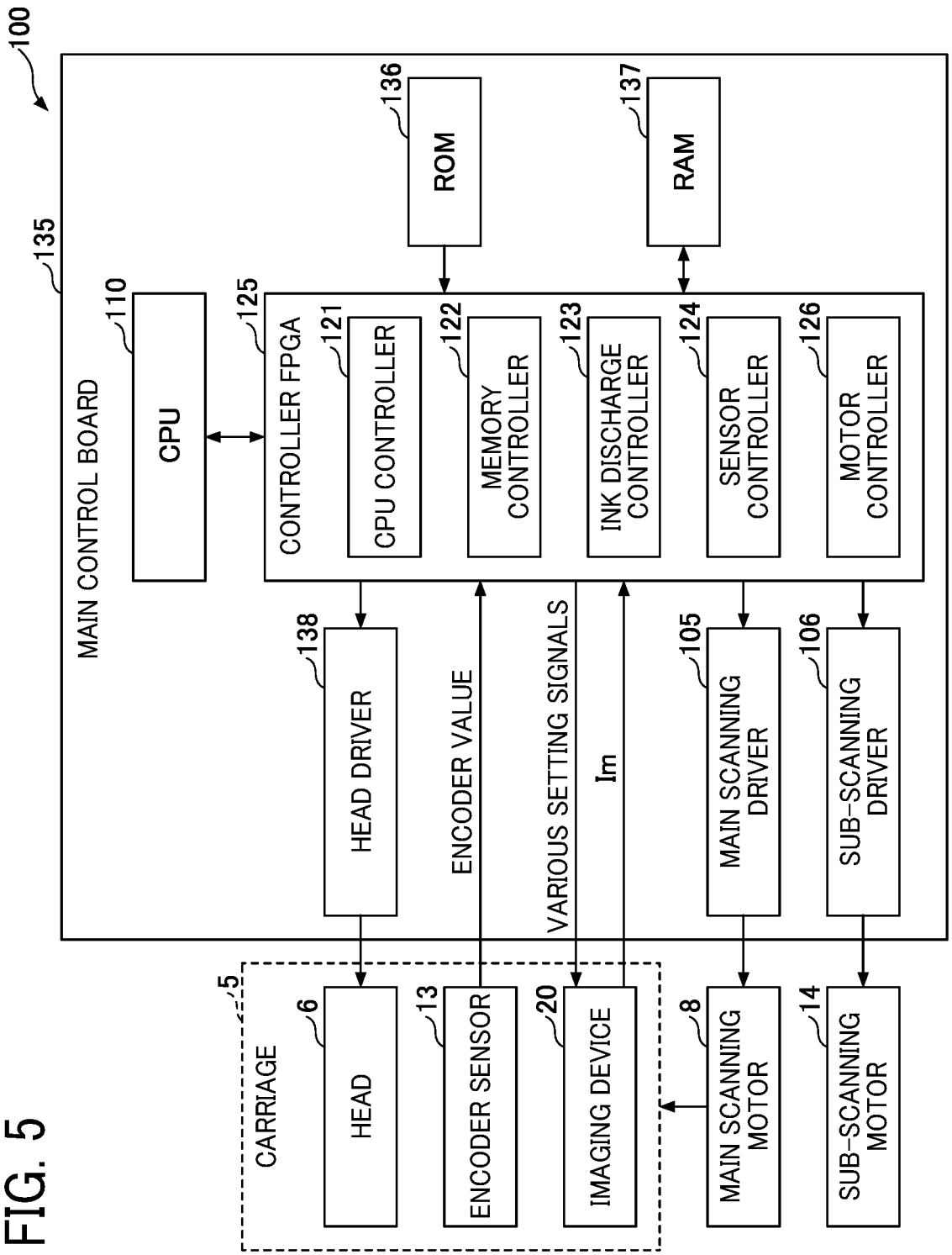
FIG. 5 is a block diagram illustrating a configuration of a main control board according to an embodiment of the present disclosure.

Next, a configuration of a main control board 135 provided for the liquid discharge apparatus 100 is described. FIG. 5 is a block diagram illustrating a hardware configuration of the main control board 135 provided for the liquid discharge apparatus 100, according to the present embodiment.

As illustrated in FIG. 4, the main control board 135 includes a central processing unit (CPU) 110, a read only memory (ROM) 136, a random access memory (RAM) 137, a head driver 138, a main scanning driver 105, a sub-scanning driver 106, and a controller field-programmable gate array (FPGA) 125. The CPU 110, the ROM 136, the RAM 137, the head driver 138, the main scanning driver 105, the sub-scanning driver 106, and the controller FPGA 125 are mounted on the main control board 135. The head 6, an encoder sensor 13, and the imaging device 20 are disposed in the carriage 5.

The CPU 110 controls the entire liquid discharge apparatus 100. For example, the CPU 110 executes various control programs stored in the ROM 136 using the RAM 137 as a working area, and outputs control instructions for controlling various operations of the liquid discharge apparatus 100. In particular, in the liquid discharge apparatus 100 according to the present embodiment, the CPU 110 implements, for example, a function of forming the correction pattern P, a function as a distance measuring device, and a function of adjusting parameters related to positions of image formation, based on distance.

The head driver 138 serves as a driver for driving the head 6, the main scanning driver 105 serves as a driver for driving the main scanning motor 8, and the sub-scanning driver 106 serves as a driver for driving a sub-scanning motor 14.

The controller FPGA 125 controls various operations of the liquid discharge apparatus 100 in cooperation with the CPU 110. The controller FPGA 125 includes, for example, a CPU controller 121, a memory controller 122, an ink discharge controller 123, a sensor controller 124, and a motor controller 126 as functional components.

The CPU controller 121 communicates with the CPU 110 to transmit various kinds of data acquired by the controller FPGA 125 to the CPU 110 and inputs a control command output from the CPU 110 to the controller FPGA 125.

The memory controller 122 performs memory control such that the CPU 110 can access the ROM 136 and the RAM 137.

The ink discharge controller 123 controls the operation of the head driver 138 in accordance with control commands from the CPU 110. Thus, the ink discharge controller 123 controls when the ink is to be discharged from the head 6 driven by the head driver 138.

The sensor controller 124 processes sensor signals such as encoder values output from the encoder sensor 13. For example, the sensor controller 124 executes processing for calculating a position, a moving speed, or a moving direction, of the carriage 5, based on the encoder values output from the encoder sensor 13.

The motor controller 126 controls the operation of the main scanning driver 105 in accordance with control commands from the CPU 110 to control the main scanning motor 8 driven by the main scanning driver 105. Thus, the motor controller 126 controls the movement of the carriage 5 in the main scanning direction. Further, the motor controller 126 controls the operation of the sub-scanning driver 106 in accordance with control commands from the CPU 110 to control the sub-scanning motor 14 driven by the sub-scanning driver 106. Thus, the motor controller 126 controls the movement of the roll sheet 120 in the Y direction.

Note that the above-described control functions are examples of control functions implemented by the controller FPGA 125, and various other control functions may be implemented by the controller FPGA 125. All or part of the above-described control functions may be implemented by a program executed by the CPU 110 or another general-purpose CPU. A part of the above-described control functions may be implemented by dedicated hardware such as another FPGA or an application specific integrated circuit (ASIC) different from the controller FPGA 125.

The head 6 is driven by the head driver 138 of which the operation is controlled by the CPU 110 and the controller FPGA 125, for discharging ink onto the roll sheet 120 to form an image.

The encoder sensor 13 outputs an encoder value obtained by detecting a mark on the encoder sheet, to the controller FPGA 125. The encoder value is used by the sensor controller 124 of the controller FPGA 125 to calculate the position, the moving speed, and the moving direction of the carriage 5. The position, the moving speed, and the moving direction of the carriage 5 calculated based on the encoder values by the sensor controller 124 are sent to the CPU 110. The CPU 110 generates a control command for controlling the main scanning motor 8, based on the position, the moving speed, and the moving direction calculated as described above, of the carriage 5, and outputs the control command to the motor controller 126.

The imaging device 20 captures an image of the correction pattern P formed on the roll sheet 120 under the control of the CPU 110 and outputs a captured image Im of the correction pattern P. The captured image Im of the correction pattern P output from the imaging device 20 is sent to the controller FPGA 125 and is temporarily stored in a predetermined storage area such as the RAM 137.

The imaging device 20 has a built-in function of converting an analog signal obtained by photoelectric conversion of the two-dimensional image sensor 201 into digital image data as analog and digital (A/D) conversion, and performing various image processing such as shading correction, white balance correction, γ correction, and image data format conversion of the image data, and then outputting the image data. Various operating conditions of the two-dimensional image sensor 201 are set in accordance with various setting signals transferred from the CPU 110 via the controller FPGA 125. Note that the various kinds of image processing for image data may be partially or entirely performed outside the imaging device 20.

The image forming device 104 of the liquid discharge apparatus 100 includes the head driver 138, the main scanning driver 105, and the sub-scanning driver 106, which are controlled by the CPU 110 and the controller FPGA 125. The image forming device 104 of the liquid discharge apparatus 100 also includes the head 6, the main scanning motor 8, and the sub-scanning motor 14, which are controlled by the head driver 138, the main scanning driver 105, and the sub-scanning driver 106, to form an image on the roll sheet 120.

A functional configuration of the main control board 135 is described with reference to FIGS. 6 and 7.

Figure 6:
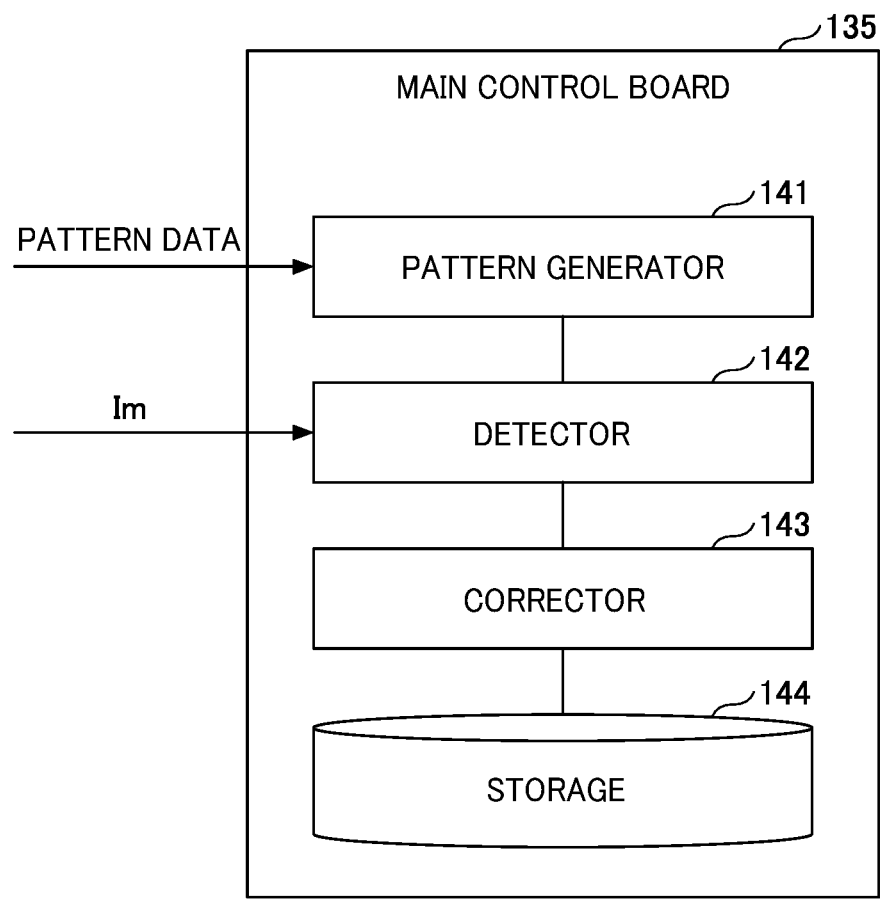
FIG. 6 is a block diagram illustrating a functional configuration of the main control board of FIG. 5, according to an embodiment of the present disclosure.

FIG. 6 is a block diagram illustrating an example of the functional configuration of the main control board 135 according to the present embodiment. FIG. 7 is a diagram illustrating the correction pattern P used by the liquid discharge apparatus 100 to correct landing position deviation of ink, according to the present embodiment.

As illustrated in FIG. 6, the main control board 135 includes a pattern generator 141, a detector 142, a corrector 143, and a storage 144. In the main control board 135, for example, the CPU 110 uses the RAM 137 as a working area to execute a control program stored in the ROM 136. Thus, the main control board 135 implements each of the functions of the pattern generator 141, the detector 142, and the corrector 143. The main control board 135 implements the function of the storage 144 by using, for example, the ROM 136.

In the present embodiment, the pattern generator 141 of the main control board 135 forms the predetermined correction pattern P on the roll sheet 120, and the detector 142 detects the position of the correction pattern P, based on a captured image Im obtained by capturing an image of the formed correction pattern P by the imaging device 20.

Figure 7:
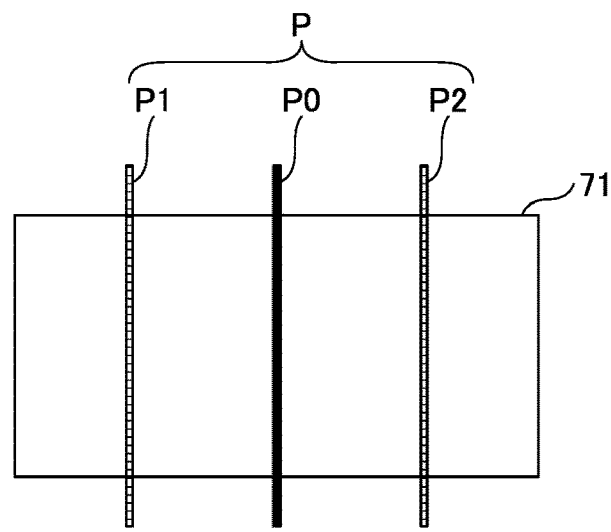
FIG. 7 is a diagram illustrating a correction pattern according to an embodiment of the present disclosure.

As illustrated in FIG. 7, the correction pattern P includes line patterns P0, P1, and P2 which are three line-shaped patterns extending in the Y direction and arranged in the X direction. Among the line patterns P0, P1, and P2, the line pattern P0 is a line pattern that serves as a reference for correcting the landing position deviation of ink. The two line patterns P1 and P2 formed on both lateral sides of the line pattern P0 in the X direction are line patterns whose positions with respect to the line pattern P0 are to be detected. In the present embodiment, the landing position of ink refers to a position at which the liquid discharged from the head 6 lands on and is applied to the recording medium.

An image capture region 71 represents an area in which the correction pattern P formed on the roll sheet 120 is captured by the imaging device 20. The imaging device 20 outputs a captured image Im of the image capture region 71 to the detector 142. The detector 142 detects the positions of the line patterns P1 and P2 with respect to the line pattern P0, based on the captured image Im. Each of the positions of the line patterns P1 and P2 corresponds to corresponding one of the landing positions of ink in the X direction.

The corrector 143 of the main control board 135 corrects landing position deviation of ink of the line patterns P1 and P2 in the X direction, based on the position data of the line patterns P1 and P2 with respect to the line pattern P0 detected by the detector 142.

In the present embodiment, the liquid discharge apparatus 100 corrects the landing position of ink in the X direction in each of twenty-one combinations of the twelve nozzle rows 60 to correct the landing position deviation of ink discharged from each of the twelve nozzle rows 60. Accordingly, a time period taken to correct the landing position deviation of ink is longer depending on the number of combinations of the nozzle rows 60.

Further, the correction pattern P is formed on the roll sheet 120 for each combination of the nozzle rows 60. Accordingly, the amount of the roll sheet 120 and the amount of the ink used for correcting the landing position deviation of ink increases depending on the number of combinations of the nozzle rows 60. The amount of the roll sheet 120 and the amount of the ink used for correcting the landing position deviation of ink are not used for image formation that is an intended purpose of the liquid discharge apparatus 100, and thus are wasted.

The landing position deviation of ink is changed by the change of the distance between the head 6 and the recording medium depending on the thickness of the recording medium such as the roll sheet 120, for example. For this reason, it is not preferable to correct the landing position deviation of ink, which takes a large amount of time and increases the waste of the roll sheet 120 and the ink, every time the thickness of the recording medium is changed.

In the present embodiment, the liquid discharge apparatus 100 detects the landing position of ink discharged from the nozzle row 60 on the roll sheet 120 by using the detector 142 and corrects the landing position deviation of the ink, based on the detection result obtained by the detector 142 by using the corrector 143. Further, the liquid discharge apparatus 100 stores data related to the relation among the landing positions of the ink discharged from each of the multiple nozzle rows 60 by using the storage 144.

The liquid discharge apparatus 100 detects the landing positions of ink discharged from one predetermined representative nozzle row among the multiple nozzle rows 60 by using the detector 142, and corrects, by using the corrector 143, the landing position deviation of ink discharged from all of the multiple nozzle rows 60, based on detection results of the landing positions of ink discharged from the representative nozzle row detected by the detector 142 and the data related to the relation among the landing positions of ink stored in the storage 144. Such a configuration as described above allows only the landing position of ink discharged from the one representative nozzle row to be detected. Accordingly, the time taken to correct the landing position deviation of ink can be shortened, and the waste of the roll sheet 120 and the ink can be reduced.

A configuration of each of the functional units is described in more detail below.

The pattern generator 141 reads pattern data stored preliminarily in, for example, the ROM 136, and causes the image forming device 104 to perform an image forming operation in accordance with the pattern data. Thus, a correction pattern P is formed on the roll sheet 120.

The image of the correction pattern P formed on the roll sheet 120 by the pattern generator 141 is captured by the imaging device 20. The captured image Im of the correction pattern P is temporarily stored in, for example, the RAM 137 via the controller FPGA 125.

The detector 142 detects landing positions of ink discharged from the nozzle row 60 on the roll sheet 120. The detector 142 detects the landing positions of ink discharged from the representative nozzle row, based on, for example, the captured image Im of the correction pattern P captured by the imaging device 20.

More specifically, the detector 142 reads an image Im of the correction pattern P captured by the imaging device 20 and stored in the RAM 137 and performs predetermined processing such as binarization processing on the captured image Im. Thus, the detector 142 detects the positions of the line patterns P0, P1, and P2 in the captured image Im by calculation.

In the present embodiment, the representative nozzle row is one nozzle row predetermined among the multiple nozzle rows provided for the liquid discharge apparatus 100. There is no particular restriction on which one nozzle row among the multiple nozzle rows is to be used as the representative nozzle row. For example, in the present embodiment, the representative nozzle row is the nozzle row 60K in the head 6a.

The position data detected by the detector 142 is position data on two-dimensional coordinates of an image expressed in units of the number of pixels. The line patterns P0, P1, and P2 in the captured image Im are obtained in many cases as a cluster of multiple pixels. The detector 142 detects a predetermined position such as the center of gravity of the cluster of multiple pixels.

In the captured image Im, the detector 142 detects positions of the line patterns P1 and P2 with respect to the line pattern P0 (or distances from the line patterns P1 and P2 to the line pattern P0) in the X direction in units of the number of pixels. The detector 142 uses predetermined imaging magnification data of the imaging device 20 to convert the distances from the line patterns P1 and P2 to the line pattern P0 in the X direction in units of the number of pixels, into actual distances represented by lengths, for example, in units of millimeters (mm).

The detector 142 can detect a position deviation amount s from a difference between each of the actual distances from the line patterns P1 and P2 to the line pattern P0 in the X direction in mm units and corresponding one of the actual distances from the line patterns P1 and P2 to the line pattern P0 in units of the number of pixels. The detector 142 outputs the detected position data to the corrector 143.

The corrector 143 corrects the landing position deviation of ink discharged from all twelve nozzle rows 60, based on the detection result of the position deviation amount s detected by the detector 142 and the data related to the relation among the landing positions stored in the storage 144. For example, the corrector 143 corrects the landing positions of ink discharged from all twelve nozzle rows 60 with reference to the detection result of the position deviation amount s of ink discharged from the representative nozzle row and the data related to the relation among the landing positions stored in the storage 144.

More specifically, the corrector 143 refers to the storage 144 to acquire data indicating relative positions between each of the nozzle rows 60. Then, the corrector 143 adds data indicating relative positions of each of the nozzle rows 60 with regard to the representative nozzle row to the position deviation s of the representative nozzle row for each of the nozzle rows 60. Thus, the corrector 143 acquires the position deviation amounts s for all the nozzle rows 60.

The corrector 143 corrects parameters related to image formation performed by the image forming device 104 for all the nozzle rows 60 in accordance with the position deviation amounts s of all the nozzle rows 60. The parameters related to the image formation include, for example, a parameter for controlling the ink discharge timing of the head 6 and a parameter for controlling the moving speed of the carriage 5. The corrector 143 transmits corrected values of the above-described parameters to the controller FPGA 125. By so doing, the corrector 143 can correct control operation performed by, for example, the ink discharge controller 123 and the motor controller 126.

The storage 144 preliminarily stores data related to the relation among the landing positions of ink discharged from each of the multiple nozzle rows 60. The storage 144 stores, for example, data indicating the relative positions of nozzle rows 60 in each of twenty-one combinations of the nozzle rows 60, which are all combinations of the nozzle rows 60.

When the liquid discharge apparatus 100 acquires data to be stored in the storage 144, the pattern generator 141 forms the correction pattern P on the roll sheet 120 for each of all the combinations of the nozzle rows 60. Then, the liquid discharge apparatus 100 captures an image of the correction pattern P for each of the combinations of the nozzle rows 60 by using the imaging device 20 and detects the position deviation amount s for each of the combinations of the nozzle rows 60 by using the detector 142. Then, the liquid discharge apparatus 100 stores the detected position deviation amount s for each of the combinations of the nozzle rows 60 in association with corresponding one of the combinations of the nozzle rows 60 in the storage 144.

In the liquid discharge apparatus 100, the data to be stored in the storage 144 is sufficient to be acquired only once, for example, at the time of shipment of the liquid discharge apparatus 100 from a factory or delivery of the liquid discharge apparatus 100 to a customer. Such a configuration can obviate the need for acquiring the data every time, for example, the thickness of the recording medium is changed.

The corrector 143 uses the detector 142 to detect the landing position of ink discharged from the representative nozzle row. The corrector 143 refers to the data stored in the storage 144 to acquire landing positions of ink discharged from the nozzle rows 60 other than the representative nozzle row, based on the detection result of the position deviation amount s of the representative nozzle row, and corrects the landing positions of ink, based on the above-described acquired data.

Method for Correcting Landing Position Deviation of Ink Performed by Liquid Discharge Apparatus 100

Figure 8:
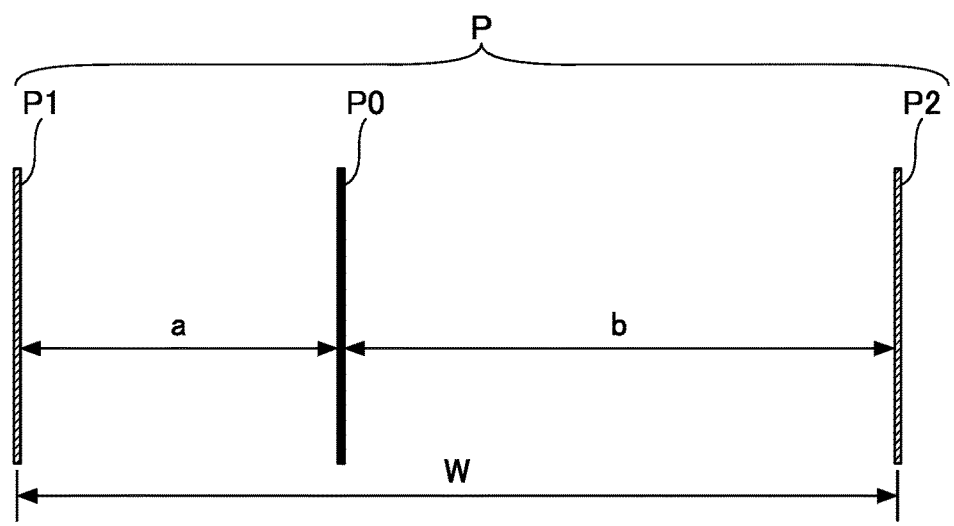
FIG. 8 is a diagram illustrating a correction method performed by a liquid discharge apparatus, according to an embodiment of the present disclosure.

FIG. 8 is a diagram illustrating a method for correcting the landing position deviation of ink in the X direction performed by the liquid discharge apparatus 100, according to an embodiment of the present disclosure. FIG. 8 illustrates a correction pattern P formed in a captured image Im.

As illustrated in FIG. 8, a distance a is a distance between the line pattern P0 as a reference and the line pattern P1 as a target to be detected, in the X direction. A distance b is a distance between the line pattern P0 as the reference and the line pattern P2 as a target to be detected, in the X direction.

In the correction performed by the liquid discharge apparatus 100, the detector 142 performs the following procedure.

1. The distance a and the distance b are detected in the captured image Im. In this case, the unit of distance is the number of pixels.
2. In the captured image Im, a position deviation amount s' of the line patterns P1 and P2 with respect to the line pattern P0 is detected by the following formula. The unit of the position deviation amount s' is the number of pixels.

$(a+b)/2-a=s'$

3. A ratio value f between the position deviation amount s' in the captured image Im and a width W' of the correction pattern P in the captured image Im is calculated by the following formula. Note that the width W' is a sum of the distance a and the distance b.

$s'/W'=f$

4. The ratio value f is multiplied by an actual width W of the correction pattern P formed on the roll sheet 120 to detect a position deviation amount s on the roll sheet 120. The unit of the position deviation amount s is mm.

As described above, the liquid discharge apparatus 100 can detect the position deviation amount s.

Correction Operation Example Performed by Liquid Discharge Apparatus 100

Figure 9:
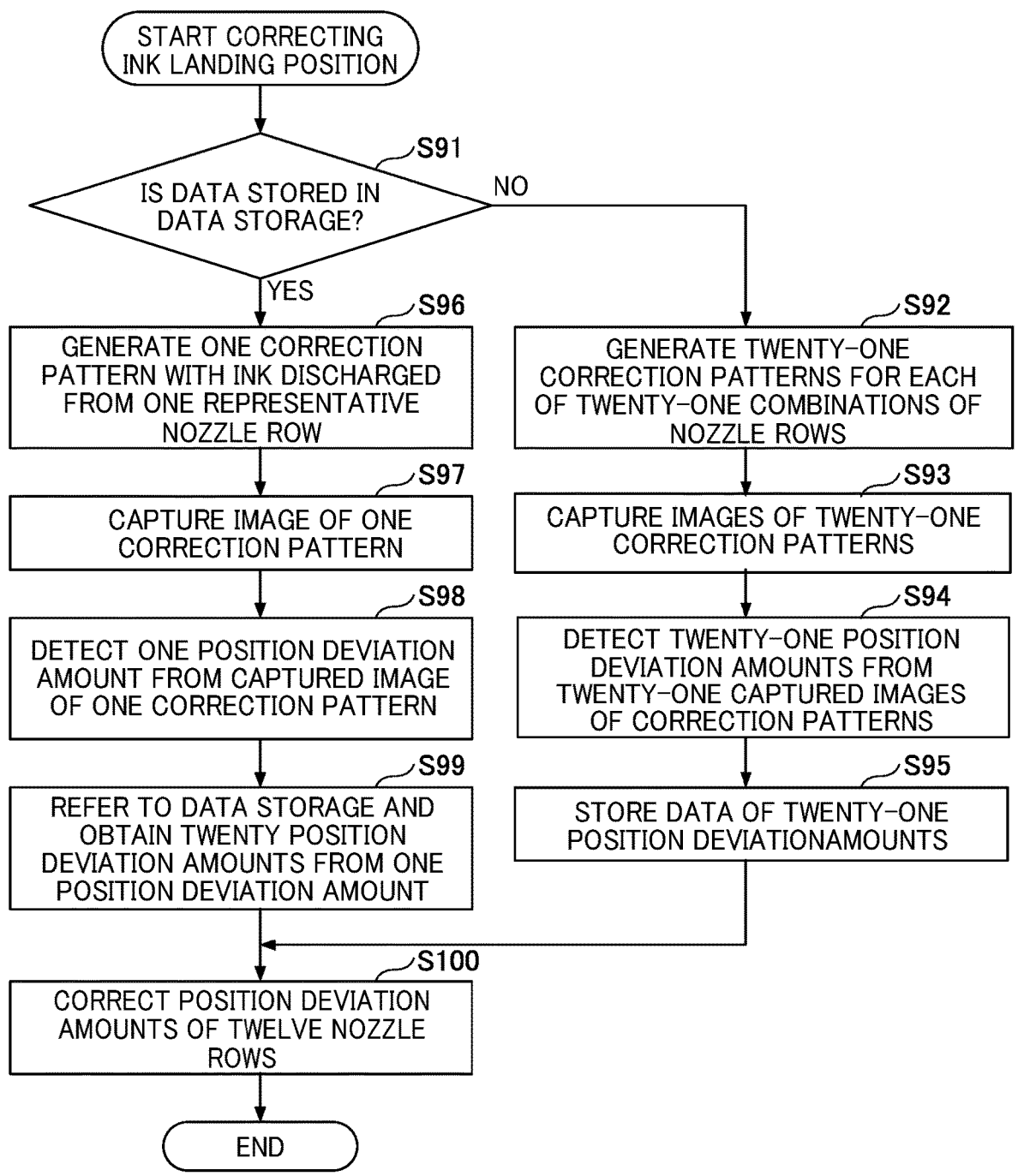
FIG. 9 is a flowchart illustrating a correction operation performed by a liquid discharge apparatus, according to an embodiment of the present disclosure.

FIG. 9 is a flowchart illustrating an example of the correction operation performed by the liquid discharge apparatus 100. When the distance between the recording medium and the head 6 is changed, such as when the thickness of the recording medium such as the roll sheet 120 is changed, the liquid discharge apparatus 100 starts the operation described in the flowchart of FIG. 9 in response to an instruction by the user of the liquid discharge apparatus 100 to start the correction processing of the landing position deviation of ink via an operation unit.

First, in step S91, the liquid discharge apparatus 100 determines whether the storage 144 stores data related to the relation among the landing positions of ink discharged from each of the twelve nozzle rows 60.

If it is determined in step S91 that the above-described data is not stored (NO in step S91), in step S92, the liquid discharge apparatus 100 causes the pattern generator 141 to form twenty-one correction patterns P on the roll sheet 120 for each of twenty-one combinations of the twelve nozzle rows 60.

Subsequently, in step S93, the liquid discharge apparatus 100 causes the imaging device 20 to capture the twenty-one correction patterns P and transfers twenty-one captured images Im to the detector 142.

Subsequently, in step S94, the liquid discharge apparatus 100 causes the detector 142 to detect twenty-one position deviation amounts s from the twenty-one captured images Im and transfers the detection results to the corrector 143 and the storage 144.

Subsequently, in step S95, the liquid discharge apparatus 100 stores the twenty-one position deviation amounts s in the storage 144. Then, the operation of the liquid discharge apparatus 100 shifts to step S100.

On the other hand, when it is determined in step S91 that the above-described data is stored (YES in step S91), in step S96, the liquid discharge apparatus 100 causes the pattern generator 141 to form one correction pattern P on the roll sheet 120 with ink discharged from one representative nozzle row.

Subsequently, in step S97, the liquid discharge apparatus 100 captures one image of the correction pattern P by the imaging device 20 and transfers one captured image Im to the detector 142.

Next, in step S98, the liquid discharge apparatus 100 causes the detector 142 to detect one position deviation amount s from the one captured image Im and to transfer the detection result to the corrector 143.

Subsequently, in step S99, the corrector 143 refers to the storage 144, based on the position deviation amount s of the representative nozzle row detected by the detector 142 to obtain the positional deviation amounts s of the twenty nozzle rows 60 other than the representative nozzle row out of the twelve nozzle rows 60. The corrector 143 obtains the positional deviation amounts s of the twenty-one nozzle rows 60, which are a sum of the position deviation amounts s of one representative nozzle row and the position deviation amounts s of each of the twenty nozzle rows 60 other than the representative nozzle row.

Subsequently, in step S100, the liquid discharge apparatus 100 corrects the position deviations of the twelve nozzle rows 60.

Such a configuration as described above allows the liquid discharge apparatus 100 to correct the landing position deviation of ink discharged from each of the twelve nozzle rows 60.

Operational Effect of Liquid Discharge Apparatus 100

As described above, the liquid discharge apparatus 100 according to the present embodiment includes the three heads 6 including four nozzle rows 60 in each of which multiple nozzles for discharging ink, i.e., liquid, are arranged in the Y direction as the predetermined direction and forms an image on the roll sheet 120 as the recording medium. In the present embodiment, the number of nozzle rows 60 is twelve in total.

The liquid discharge apparatus 100 includes the detector 142 to detect the landing positions of ink discharged from each of the nozzle rows 60 on the roll sheet 120, the corrector 143 to correct the landing position deviation of ink, based on the detection result by the detector 142, and the storage 144 to store data related to the relation among the landing positions of ink discharged from each of the twelve nozzle rows 60.

The detector 142 detects the landing positions of ink discharged from one predetermined representative nozzle row out of the twelve nozzle rows 60, and the corrector 143 corrects the landing positions of ink discharged from all the twelve nozzle rows 60, based on the results of the detection by the detector 142 of the landing positions of ink discharged from the representative nozzle row and data related to the relation among the landing positions stored in the storage 144.

For example, the corrector 143 refers to the data related to the relation among the landing positions of ink stored in the storage 144, based on the detection result of the detector 142 of the landing position of the ink discharged from the representative nozzle row to correct the landing positions of ink discharged from the nozzle rows 60 other than the representative nozzle row in the twelve nozzle rows 60.

The data related to the relation among the landing positions of ink discharged from each of the twelve nozzle rows 60 is acquired only once, for example, at the time of shipment of the liquid discharge apparatus 100 from the factory or delivery of the liquid discharge apparatus 100 to a customer and is stored in the storage 144. After the data is stored in the storage 144, the liquid discharge apparatus 100 detects only the landing positions of ink discharged from one representative nozzle row to correct the landing positions of all the twelve nozzle rows 60. Accordingly, the liquid discharge apparatus 100 can shorten the time for correcting the landing position deviation of ink. Thus, the liquid discharge apparatus 100 can correct the landing position deviation of ink on the roll sheet 120 in a short time.

Further, the liquid discharge apparatus 100 does not need to form the twenty-one correction patterns P on the roll sheet 120 to correct the landing position deviation of ink discharged from the nozzle row 60. Accordingly, the amount of the roll sheet 120 and the ink used for correcting the landing position deviation of ink can be reduced. Thus, waste of the roll sheet 120 and the ink can be reduced.

In the present embodiment, the detector 142 detects the landing position of ink discharged from the representative nozzle row, based on a predetermined correction pattern P formed on the roll sheet 120 by ink discharged from the representative nozzle row. The correction pattern P includes the line patterns P0, P1, and P2, which are three line-shaped patterns, which extend in the Y direction and are arranged in the X direction, i.e., the direction perpendicular to the predetermined direction. Such a configuration as described above allows the simple correction pattern P to be used to correct the landing position deviation of ink in the X direction.

Further, in the present embodiment, the liquid discharge apparatus 100 further includes the imaging device 20 that captures an image of a predetermined correction pattern P formed on the roll sheet 120 by ink discharged from the representative nozzle row. The detector 142 detects landing positions of ink discharged from the representative nozzle row, based on the captured image Im of the correction pattern P captured by the imaging device 20. Such a configuration as described above allows the detector 142 to detect, for example, the distance between the line patterns P0, P1, and P2 in the correction pattern P by image processing of the two-dimensional image. Accordingly, for example, the distance between the line patterns P0, P1, and P2 can be detected accurately and with high robustness. Accordingly, the liquid discharge apparatus 100 can accurately correct the landing position deviation of ink discharged from the nozzle row 60.

Other Embodiments

Several embodiments of the present disclosure have been described above. However, the embodiments of the present disclosure are not limited to such specific embodiments, and various modifications and changes can be made within the scope of the present disclosure.

For example, in the above-described embodiment, an inkjet printer is typically described as an example of the liquid discharge apparatus. However, embodiments of the present disclosure are not limited to the liquid discharge apparatus using the inkjet printing method. In some embodiments, a liquid discharge apparatus may include devices to feed, convey, and eject a material onto which liquid can adhere. The liquid discharge apparatus may further include, for example, a pretreatment apparatus and a post-processing apparatus.

For example, examples of the liquid discharge apparatus include an image forming apparatus that discharges ink to form an image on a sheet of paper, and a stereoscopic fabrication apparatus (three-dimensional fabrication apparatus) that discharges fabrication liquid to a powder layer obtained by forming powder into a layer for fabricating a stereoscopic fabrication object (three-dimensional fabrication object).

Such a liquid discharge apparatus is not limited to an apparatus that discharges liquid to visualize meaningful images, such as letters or figures. For example, an apparatus that forms a meaningless pattern, or an apparatus that fabricates a three-dimensional image are also included.

The above-described term "material on which liquid can be adhered" represents a material on which liquid is at least temporarily adhered, a material on which liquid is adhered and fixed, or a material into which liquid is adhered to permeate. Examples of the "material on which liquid can be adhered" include recording media, such as paper sheet, recording paper, recording sheet of paper, film, and cloth, electronic components, such as electronic substrate and piezoelectric element, and media, such as powder layer, organ model, and testing cell. The "material on which liquid can be adhered" includes any material on which liquid is adhered, unless particularly limited.

Examples of the above-described material to which liquid is adherable include any materials to which liquid can adhere even temporarily, such as paper, thread, fiber, fabric, leather, metal, plastic, glass, wood, and ceramic.

Further, the term "liquid" includes any liquid having a viscosity or a surface tension that is dischargeable from the head. However, preferably, the viscosity of the liquid is not greater than 30 mPa·s under ordinary temperature and ordinary pressure or by heating or cooling. More specifically, examples of the liquid include a solution, a suspension, or an emulsion that contains, for example, a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant. Such a solution, a suspension, and an emulsion are used for, for example, inkjet ink, a surface treatment solution, a liquid for forming components of an electronic element and a light-emitting element or a resist pattern of an electronic circuit, or a material solution for three-dimensional fabrication.

Examples of energy generation sources for discharging liquid include piezoelectric actuators such as laminated piezoelectric elements and thin film piezoelectric elements, thermal actuators using electrothermal conversion elements such as heating resistors, and electrostatic actuators composed of a diaphragm and a counter electrode.

Examples of the liquid discharge apparatus further include a treatment liquid coating apparatus which discharges the treatment liquid to a sheet to coat the treatment liquid on a sheet surface to modify the sheet surface and an injection granulation apparatus by which a composition liquid including raw materials dispersed in a solution is discharged through nozzles to granulate fine particles of the raw materials.

In the terms according to the embodiments, image formation, recording, printing, printing, molding, for example, are all synonymous.

Embodiments of the present disclosure include a liquid discharge method. For example, a liquid discharge method is a liquid discharge method performed by a liquid discharge apparatus that includes a head having multiple nozzle rows in each of which multiple nozzles for discharging liquid are arranged in a predetermined direction and forms an image on a recording medium. The liquid discharge method includes a step in which a detector of the liquid discharge apparatus detects landing positions of liquid discharged from the nozzle rows on the recording medium, a step in which a corrector corrects the landing positions of liquid, based on the detection result by the detector, and a step in which a storage stores data related to a relation among the landing positions of liquid discharged from each of the multiple nozzle rows. The detector detects the landing positions of the liquid discharged from one representative nozzle row among the multiple nozzle rows. The corrector corrects the landing positions of all of the multiple nozzle rows, based on the detection result by the detector of the landing positions of the representative nozzle row and the data related to the relation among the landing positions stored in the storage. Such a liquid discharging method as described above can achieve operational effects equivalent to those of the above-described liquid discharge apparatus 100.

The numbers such as ordinal numbers and numerical values that indicate quantity are all given by way of example to describe the technologies to implement the embodiments of the present disclosure, and no limitation is indicated to the numbers given in the above description. In addition, the description as to how the elements are related to each other, coupled to each other, or connected to each other are given by way of example to describe the technologies to implement the embodiments of the present disclosure, and how the elements are related to each other, coupled to each other, or connected to each other to implement the functionality in the present disclosure is not limited thereby.

Each of the functions of the described embodiments may be implemented by one or more processing circuits or circuitry. In the present embodiment, the processing circuit in the present specification includes a processor programmed to execute each function by software such as a processor implemented by an electronic circuit, and a device such as an application specific integrated circuit (ASIC), a digital signal processor (DSP), a field programmable gate array (FPGA), or a conventional circuit module designed to execute each function described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus for forming an image on a recording medium, the liquid discharge apparatus comprising:
   a head including a plurality of nozzle rows in each of which a plurality of nozzles for discharging liquid are arranged in a predetermined direction, wherein the plurality of nozzle rows comprises three or more nozzle rows configured to discharge colored ink liquid,
   processing circuitry configured to:
   detect landing positions of the liquid discharged from the plurality of nozzle rows on the recording medium; and
   correct the landing positions of the liquid based on a result of detecting the landing positions of the liquid; and
   a memory configured to store data related to a relation among the landing positions of the liquid discharged from the plurality of nozzle rows,
   wherein the processing circuitry is configured to detect landing positions of the liquid discharged from one representative nozzle row among the plurality of nozzle rows, and
   wherein the processing circuitry is configured to correct landing positions of the liquid discharged from all of the plurality of nozzle rows based on a result of detecting the landing positions of the liquid discharged from the one representative nozzle row and the data related to the relation among the landing positions stored in the memory.

2. The liquid discharge apparatus according to claim 1, wherein the processing circuitry is configured to detect the landing positions of the liquid discharged from the one representative nozzle row based on a correction pattern formed on the recording medium by the liquid discharged from the one representative nozzle row, and
   wherein the correction pattern extends in the predetermined direction and includes three line-shaped patterns arranged in a direction perpendicular to the predetermined direction.

3. The liquid discharge apparatus according to claim 1, further comprising an imaging device configured to capture an image of a correction pattern formed on the recording medium by the liquid discharged from the one representative nozzle row, wherein the processing circuitry is configured to detect the landing positions of the liquid discharged from the one representative nozzle row based on the image of the correction pattern captured by the imaging device.

4. The liquid discharge apparatus according to claim 3, wherein the processing circuitry is configured to, based on the result of detecting the landing positions of the liquid discharged from the one representative nozzle row, refer to the data related to the relation among the landing positions stored in the memory to correct landing positions of the liquid discharged from the nozzle rows other than the one representative nozzle row in the plurality of nozzle rows.

5. A liquid discharge method for a liquid discharge apparatus that includes a head having a plurality of nozzle rows in each of which a plurality of nozzles for discharging liquid are arranged in a predetermined direction to form an image on a recording medium, the liquid discharge method comprising:

detecting landing positions of the liquid discharged from the plurality of nozzle rows on the recording medium, wherein the plurality of nozzle rows comprises three or more nozzle rows configured to discharge colored ink liquid;

correcting the landing positions of the liquid based on a result of the detecting; and storing data related to a relation among the landing positions of the liquid discharged from the plurality of nozzle rows in a memory, wherein the detecting includes detecting landing positions of the liquid discharged from one representative nozzle row among the plurality of nozzle rows, and wherein the correcting includes correcting landing positions of the liquid discharged from all of the plurality of nozzle rows based on a result of the detecting of the landing positions of the liquid discharged from the one representative nozzle row and the data related to the relation among the landing positions stored in the memory.

* * * * *